United States Patent [19]

Starling

[11] 4,009,730
[45] Mar. 1, 1977

[54] COMBINATION PRESSURE CONTROL SELECTOR VALVE

[75] Inventor: James G. Starling, Peoria, Ill.
[73] Assignee: Caterpillar Tractor Co., Peoria, Ill.
[22] Filed: Oct. 3, 1975
[21] Appl. No.: 619,339
[52] U.S. Cl. .................. 137/625.69; 137/625.3; 137/625.68
[51] Int. Cl.² .................................. F15B 13/04
[58] Field of Search ..... 137/625.3, 625.68, 625.69, 137/625.48; 251/325

[56] References Cited

UNITED STATES PATENTS

| | | | |
|---|---|---|---|
| 2,631,571 | 3/1953 | Parker | 137/625.68 |
| 2,952,275 | 9/1960 | Mock | 137/625.48 X |
| 3,049,147 | 8/1962 | Neilson | 137/625.69 |
| 3,123,335 | 3/1964 | Darling | 251/325 X |
| 3,477,225 | 11/1969 | Cryder et al. | 60/427 X |
| 3,477,472 | 11/1969 | Mercier | 137/625.69 X |
| 3,862,645 | 1/1975 | Bianchetta et al. | 137/625.3 X |

FOREIGN PATENTS OR APPLICATIONS 2,195  7/1909  United Kingdom .......... 137/625.69

*Primary Examiner*—Alan Cohan
*Assistant Examiner*—Gerald A. Michalsky
*Attorney, Agent, or Firm*—Phillips, Moore, Weissenberger, Lempio & Majestic

[57] ABSTRACT

A manually operated clutch valve adapted for use with a forward-reverse clutch provides modulated flow by use of a combination of linearly tapered metering slots and passages on the valve spool lands. The valve provides for linear pressure rise for proportionate lever movement in addition to the capability of selection of forward or reverse clutch engagement. Linear pressure rise occurs until about 90% of the maximum spool travel has been achieved at which point the full flow is abruptly provided to produce engagement of the clutch and thereby prevent a stick clip clutch condition.

7 Claims, 4 Drawing Figures

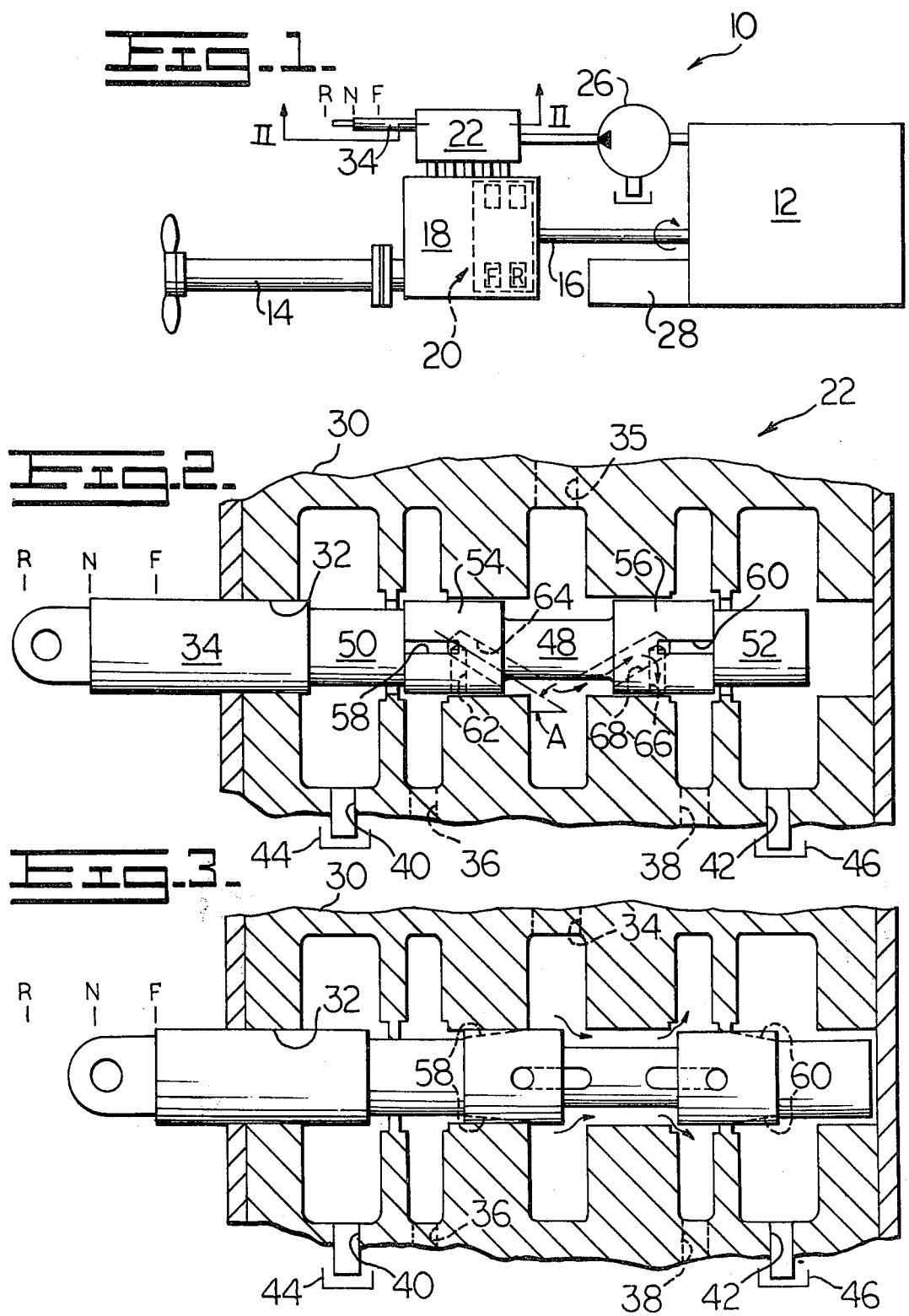

COMBINATION PRESSURE CONTROL SELECTOR VALVE

BACKGROUND OF THE INVENTION

The present invention relates to valves and more particularly to a modulating control valve.

The described valve is especially suitable for application to control operation of a forward-reverse clutch. passage means Use of modulating control valves to control hydraulic system operations has been known for some time. Numerous constructions for modulating control valves are known. For example, see the following patents, all assigned to the assignee of the present invention: U.S. Pat. Nos. 2,972,536 issued Feb. 14, 1961; 3,477,225 issued Nov. 11, 1969; 3,486,418 issued Dec. 30, 1969; 3,556,155 issued Jan. 19, 1971; and 3,862,645 issued Jan. 28, 1975. These patents exemplify the prior art approach to modulation control of either a main control valve or a hydraulic motor.

However, these problems and solutions differ from those encountered when considering control of a slippable torous friction clutch such as shown in U.S. Pat. No. 3,217,851 issued Nov. 16, 1965, also to the assignee of the instant invention. The difficulty encountered with controlling these clutches is the tendency to "stick slip" at some point in their application. Stick slip or damaging clutch torsionals always occur near the lock up point with sintered bronze clutches. With stick slip, severe clutch damage can occur if there is an extremely sudden lock up of clutch. This is, of course, very costly in terms of lost time and operation of the equipment with which the clutch is used.

SUMMARY AND OBJECTS OF THE INVENTION

It is therefore the primary object of the present invention to provide a combination pressure control selector valve which prevents stick slip of clutches with which it is used.

It is another object of the present invention to provide a control valve for use with the forward reverse clutch which provides linear application of force through the slip range and then triggers an abrupt application of force to engage the clutch without stick slip.

It is a further object of this invention to provide a control valve having suitable modulating means for precise and accurate control of a clutch with which it is used.

In accordance with the present invention, the combination pressure control selector valve is provided with a suitable modulating means on the valve spool for insuring complete and accurate control of force application. The modulating means comprises the combination of linearly tapered metering slots on the valve spool lands together with control orifices. Inlet flow is controlled by an orifice until the spool is about 90% of its maximum displacement at which point full flow is abruptly provided so that normal engagement of the clutch occurs and the stick slip condition is prevented.

BRIEF DESCRIPTION OF THE DRAWINGS

The above and other objects and advantages of the present invention will become apparent from the following specification when read in conjunction with the accompanying drawings wherein:

FIG. 1 is an illustration of a marine power system utilizing the combination pressure control selector valve of the instant invention;

FIG. 2 is a cross sectional view of the combination pressure control selector valve taken along the lines II—II in FIG. 1 and shown in neutral position;

FIG. 3 is a view of the same showing the valve spool in forward position; and

DETAILED DESCRIPTION

Figure 4:
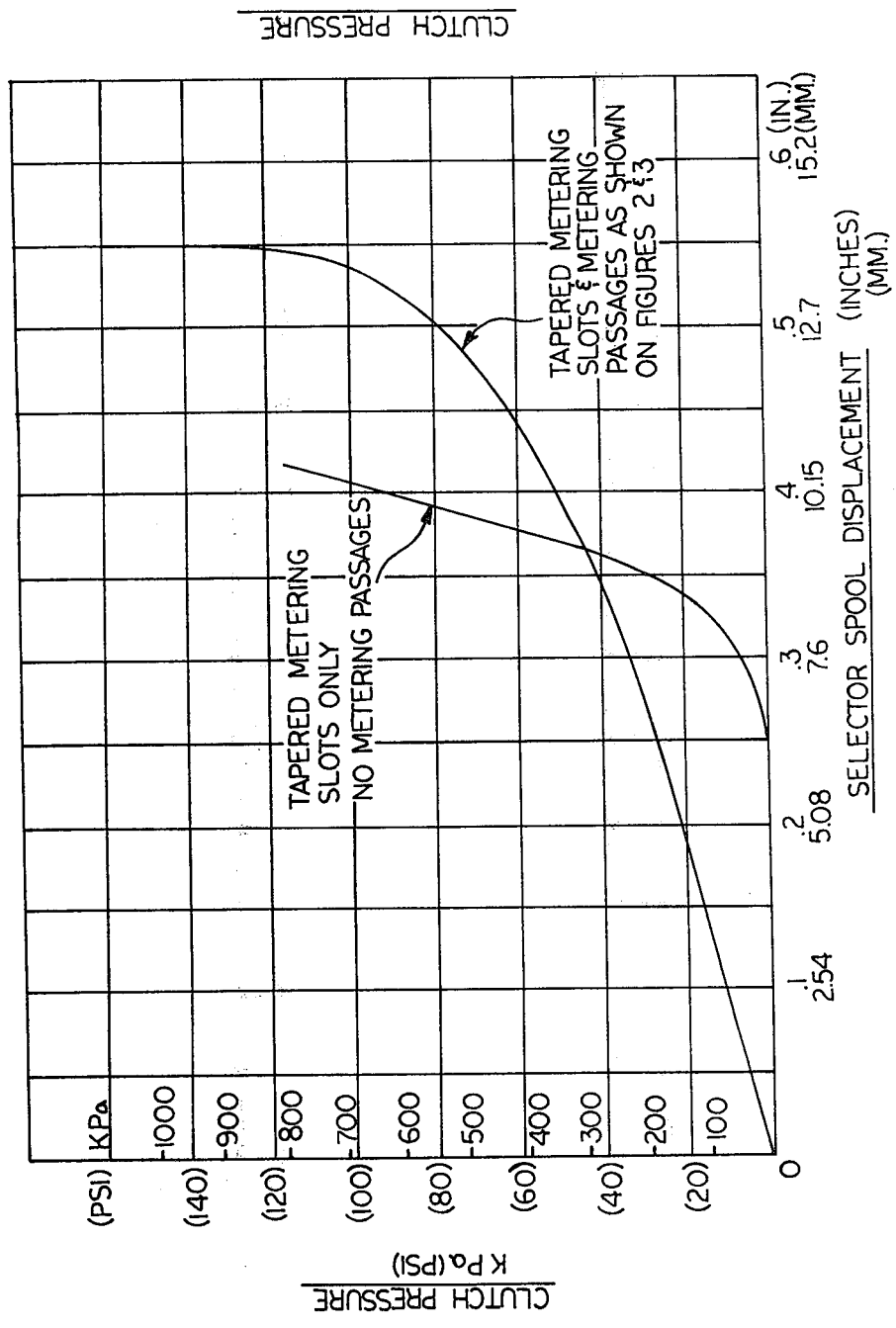
FIG. 4 is a comparative graph illustrating the operation of the valve of the present invention.

Turning to FIG. 1, there is shown generally at 10 a marine engine system. While a marine engine system is shown, it is to be understood that such is for purposes of illustration only and other systems are also contemplated for application of the instant control selector valve. The system comprises a marine engine 12 which transmits power through a propeller shaft 14 by means of a shaft 16 connected to a transmission 18. Transmission 18 includes at 20 a foward-reverse clutch such as a slippable torus clutch. The clutch 20 and thereby the transmission of power from engine 12 through shaft 14 is controlled by means of control valve 22 mounted on the transmission which is manually operable by means of valve spool 34 which is movable from a central, neutral position to reverse and forward positions. Auxiliary pump 26 is also driven off engine 12 by its fluid pressure for actuation of clutch 20 through a control of valve 22. Auxiliary equipment 28 is also powered by engine 12. As aforementioned, a marine engine system is shown for illustration only. The instant control valve could also be used with a power shift transmission as, for example, an earthmoving vehicle.

Turning to FIG. 2, there is shown a sectional view of valve 22 which includes a body 30 having axial bore 32 therein. A valve spool 34 is slidably fitted within the bore. Inlet passage 35 is centrally disposed in the valve body and communicates with the source of fluid pressure (not shown). Reverse and forward outlet passages 36, 38, respectively, are located in the body on opposite sides of the inlet passage and spaced therefrom. Similarly, drain passages 40, 42 leading to drains 44, 46, respectively, are also provided. Annular grooves 50 and 52 on opposite sides of the centrally disposed annular groove 48 on spool 34 serve to define a pair of lands 54, 56. The lands are arranged to close off communication between the inlet passage 35 and the outlet passages 36, 38 when in the neutral position shown.

Modulating means in the form of linearly tapered metering slots 58, 60 are provided and extend from the land edge away from the inlet to a point centrally disposed on the land. Further modulating means in the form of passages 62, 64, 66, 68 are also provided. Passages 62 and 66 are formed on the spool lands in the centrally disposed position. Angular passages 64, 68 intersect these radially outwardly disposed passages and lead to annular groove 48, thereby communicating with inlet 35. The axially disposed passages are preferably at an angle A of approximately 30°. The slots are located 90° apart from the passages around the periphery. It should be noted that the slots and passages in FIG. 2 are shown rotated 90° from their actual position.

FIG. 3 shows a view of the control valve in the forward position. FIG. 4 shows clutch pressure versus selector spool displacement illustrating the combined effect of the linearly tapered metering slots and metering passages of the instant invention. The pressure rises linearly for about 90% of selector spool displacement. At this point a sudden increase in clutch pressure is achieved in the remaining 10% of displacement. In this manner, application of the clutch that is controlled by the combination pressure control selector valve is gradual only until the point of engagement. After the point of engagement, application is abrupt. In this manner, stick slip is eliminated.

While the present invention is illustrated with respect to a specific embodiment, it is to be understood that numerous changes and modifications may be made in the construction arrangement of parts of the invention without departing from the spirit and scope thereof as defined by the appended claims.

What is claimed is:

1. In a control valve having a bore in a body, an inlet passage communicating with said bore, a pair of outlet passages in said body each spaced axially from said inlet passage and on opposite sides thereof, a spool reciprocably mounted in said bore to close off communication between said inlet and outlet passages, said spool having a central, annular groove arranged to open such communication upon axial movement of said spool, said spool having a pair of laterally disposed annular grooves on said spool opposite sides of said central groove so as to define a pair of lands, and wherein the improvement comprises means for effecting modulated flow through the valve comprising in combination a tapered metering slot means on each of said lands extending axially from a lateral groove to a centrally disposed point on said land, and passage means in each of said lands communicating a centrally disposed point on said land with a respective laterally disposed groove, wherein said passage means comprises a radially directed bore centrally disposed in said land intersecting an angularly directed bore opening into said central groove.

2. The control valve of claim 1 wherein said metering slot means comprise a pair of metering slots on opposite sides of said land.

3. The control valve of claim 2 wherein said radially directed bore is oriented 90° from said metering slots.

4. The control valve of claim 3 wherein said angularly directed bore makes an angle of approximately 30° with the spool axis.

5. The control valve of claim 4 further including a pair of drain passages in said body each spaced axially from a respective one of said outlet passages.

6. The control valve of claim 2 wherein said slots are tapered.

7. The control valve of claim 2 wherein said slots are linearly tapered.

* * * * *